United States Patent [19]

Kulakowski et al.

[11] Patent Number: 4,813,011

[45] Date of Patent: Mar. 14, 1989

[54] DATA PROCESSING PERIPHERAL SUBSYSTEMS HAVING A CONTROLLER AND A PLURALITY OF PERIPHERAL DEVICES

[75] Inventors: John E. Kulakowski; Rodney J. Means, both of Tucson, Ariz.

[73] Assignee: International Business Machines Corporation, Armonk, N.Y.

[21] Appl. No.: 733,421

[22] Filed: May 13, 1985

[51] Int. Cl.[4] .................. G06F 3/06; G06F 13/00; G11B 21/00
[52] U.S. Cl. .................. 364/900; 364/200; 360/77.03; 369/43; 369/44
[58] Field of Search .................. 360/135, 77, 48; 358/128, 128.5; 365/234; 364/200 MS File, 900 MS File; 369/43, 44

[56] References Cited

U.S. PATENT DOCUMENTS

| Re. 31,069 | 10/1982 | Chang et al. | 360/53 |
|---|---|---|---|
| 3,931,457 | 1/1976 | Mes | 360/48 |
| 3,999,163 | 12/1976 | Levy et al. | 364/200 |
| 4,016,603 | 4/1977 | Ottesen | 360/135 |
| 4,079,454 | 3/1978 | Sorenson et al. | 364/200 |
| 4,094,013 | 6/1978 | Hill et al. | 365/234 |
| 4,142,209 | 2/1979 | Hedlund et al. | 358/128 |
| 4,183,084 | 1/1980 | Lawson | 364/200 |
| 4,200,928 | 4/1980 | Allan et al. | 364/200 |
| 4,229,808 | 10/1980 | Hui | 365/234 |
| 4,332,022 | 5/1982 | Ceshkovsky | 369/44 |
| 4,338,629 | 7/1982 | Oprandis et al. | 358/128.5 |
| 4,396,961 | 8/1983 | Prasad et al. | 360/78 |
| 4,423,480 | 12/1983 | Bauer et al. | 364/200 |
| 4,433,379 | 2/1984 | Schenk et al. | 364/200 |

OTHER PUBLICATIONS

IBM Technical Disclosure Bulletin, Stevenson, "Transparent Roll Mode for Rotating Device", vol. 13, No. 1, Jun. 1970, pp. 93-95.
IBM Technical Newsletter 6N26-0351, pp. 79, 80, Nov. 15, 1979.
IBM Publication GA22-6974-4, pp. 7, 8, 10, 11, 19-23, 25, 33, 34, 38, 39, 43, 44; 1978.

Primary Examiner—Gareth D. Shaw
Assistant Examiner—Christina M. Eakman
Attorney, Agent, or Firm—H. F. Somermeyer

[57] ABSTRACT

A data recorder employs a disk record having a spiral track with either magnetically or optically sensible indicia. A normal mode of operation is to repeatedly scan one turn or circumvolution of the spiral track for emulating a circularly closed track. The recorder responds to received commands from a utilization device to tailor the disk access and recovery operations to the received command based upon command parameters and current status of the disk record. Electrical circuit and programming arrangements for effecting the controls are disclosed.

16 Claims, 6 Drawing Sheets

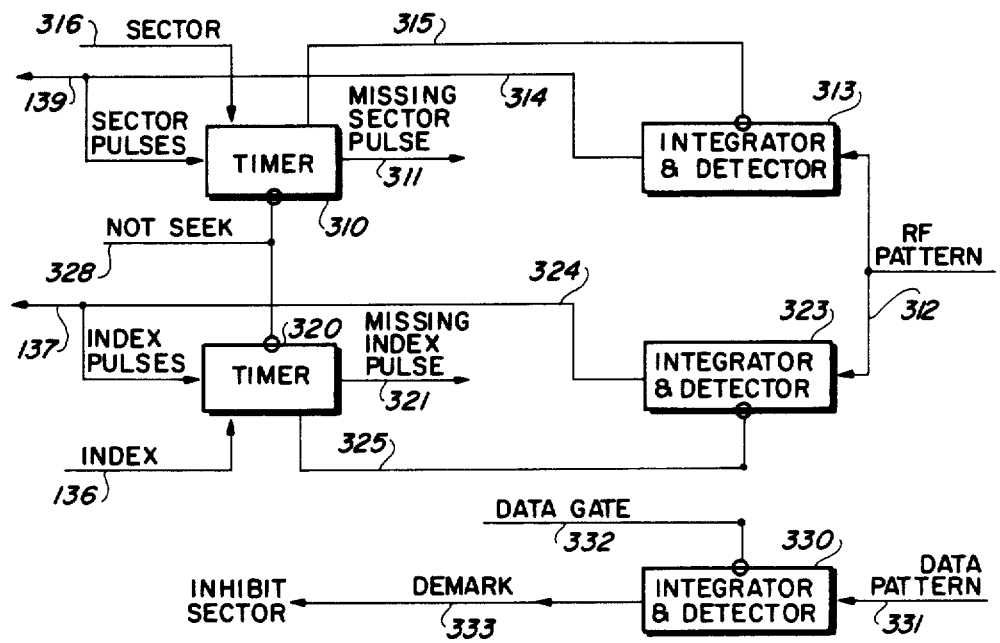
FIG. 9
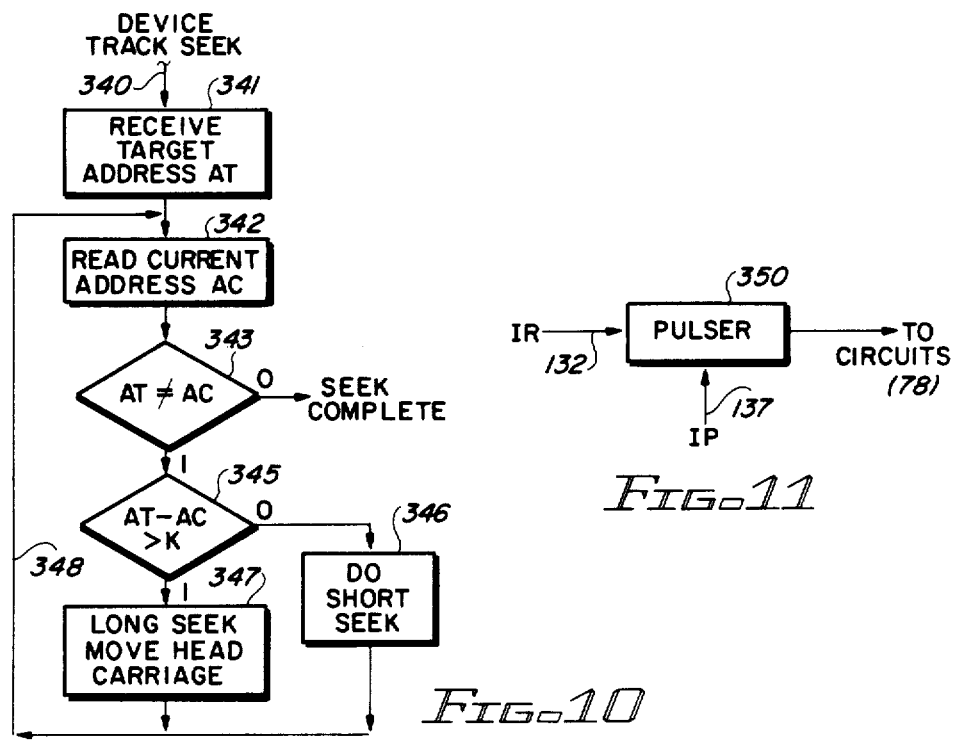
FIG. 10
FIG. 11

DATA PROCESSING PERIPHERAL SUBSYSTEMS HAVING A CONTROLLER AND A PLURALITY OF PERIPHERAL DEVICES

DOCUMENTS INCORPORATED BY REFERENCE

International Business Machines Corporation publication GA22-6974-4 (1978).

Bauer et al. U.S. Pat. No. 4,423,480 is incorporated for its showing of a control unit and a peripheral device which are interconnected together and the control circuits effecting such interconnection.

BACKGROUND OF THE INVENTION

1. Field of the Invention

The present invention relates to peripheral data processing subsystems and particularly those subsystems employing electrical and logical connections between a controller and a plurality of peripheral devices. The peripheral devices are preferably data storage devices.

2. Discussion of the Prior Art

Information-bearing signal recorders employing disks with spiral tracks have been used for years for recording video signals and composite (video, audio and control) signals. The usual mode of operation used in such disk recorders causes a transducer means to continuously follow a spiral track on a disk for presenting video as a series of frames to create a reproduced motion picture. Each circumvolution, or turn, of the spiral track usually stores two picture frames or one video image (two video frames are interlaced to create one image). Still framing, also termed "stop motion", is achieved by interrupting the spiral scanning by causing the scanning transducer means to either repeatedly scan the same circumvolution of the spiral or store the video signals read from one circumvolution in a signal buffer separate from the video disk player. For example, the Oprandis et al. patent U.S. Pat. No. 4,338,629 shows a specific stop-motion control causing the transducer means to jump from one circumvolution to the immediately preceding circumvolution for each rotation of the video disk. U.S. Pat. No. 4,332,022 shows another stop-motion control for video disk players.

While the usual video presentation requires a continuous scan of successive circumvolutions in the spiral track to recreate the video, using stop-motion controls without "tearing" the picture apparently requires either special controls or buffering of the video-bearing signal. An example of one control to avoid picture tearing is shown in Prasad et al. patent U.S. Pat. No. 4,396,961.

The format of signals in a spiral track can be crucial to successful operation of a disk recorder employing such disk media. The Mes patent U.S. Pat. No. 3,931,457 shows a video disk format having a nonvideo angular sector for each circumvolution with all of the nonvideo sectors lying along a common radial line. One portion of the nonvideo sector, a norecording area, is a starting or orienting area, while another portion of the nonvideo sector stores the address of a corresponding circumvolution. Frame synchronization signals are also provided. The nonvideo sector apparently corresponds to "flyback" time of a display used to display the carried image. This patent also teaches that either plural concentric tracks or a single spiral track may be employed. The spiral track is illustrated.

While a single spiral track on a disk has been employed for video disks which store one image per turn or circumvolution of the spiral track, data recorders, particularly ones employing magnetic disks, have almost always used concentric tracks for facilitating random access to the stored data. The record surface of the disk is divided into equal angular-sized data-storing sectors, each sector usually having track- and sector-identifying data in addition to storing data. Many of the data-storing disk recorders employ a stack of coaxial co-rotating disks which are simultaneously scanned respectively by a plurality of heads mounted on a common support radially movable with respect to the disk. In this manner, one track on each of the co-axial disks can be accessed without radially moving the common support. Generally, access to the various simultaneously-scanned tracks is serial, with electronic circuits switching and controlling which track is to be accessed. All tracks having a common radius are termed a "cylinder of tracks".

In this arrangement, occasions arise wherein the data contents of more than one track in a cylinder are to be transferred as one unit of data. To avoid rotational latency delays inherent in disk recorders, a so-called roll mode is employed, such as described in the IBM TECHNICAL DISCLOSURE BULLETIN, Vol. 13, No. 1 in an article by D. A. Stevenson "Transparent Roll Mode for Rotating Device" on pages 93-95 (June 1970). In the roll mode, access to a first track in the cylinder occurs at the first-encountered sector to be transferred, then the data to the end of that track and of all other tracks is transferred, followed by transferring the data on the first track that was not initially transferred. This arrangement employs electronic switching to make the series of concentric tracks appear as a single track which can be conceptually viewed as a helix. An implementation of the roll mode is also described in the IBM Newsletter No. GN26-0351, Nov. 15, 1979, on pages 79 and 80.

In any disk data recorder, it is desired to simplify the controls yet provide efficient operation. Optical video recorders offer a high areal density of recording greater than that of the present-day magnetic disk data recorders. It is desired to take advantage of such areal density. To quickly do so, it is advantageous to employ the track layout usually found in video recorders, i.e., the single spiral track rather than the random-access-oriented concentric tracks. Therefore, a simple but effective control is desired for using the video spiral track disks for data recording which emphasizes random access as desired for use in data processing systems.

Another important aspect of data-storing disk recorders is the electrical and logical connections and control electronics which enable access to data-storing sectors of a data storage disk. Since costs are an ever dominant factor in manufacturing such disk recorders, the connections and associated control electronics should be simple, yet allow a maximal flexibility for growth in data capacities while enabling efficient access. Connections of peripheral devices to host processors and control units/controllers have employed so-called tag control lines which are operationally associated with data transfer lines or buses. The Moyer et al. patent U.S. Pat. No. 3,303,476 also shows using such tag control lines for setup and termination of peripheral data transfers. The address of the peripheral device which will participate in such transfers is sent over the data lines to the peripheral devices. Moyer et al. show a so-called "daisy-chain" connection wherein all peripheral devices in the daisy chain are connected to one subchannel of a host processor. In the Moyer et al. system, like the peripheral connections of the International Business Machines Corporation (IBM) host processors, data is transferred over one-way data buses termed Bus Out and Bus In. The IBM peripheral connecting system is described in the IBM publication GA22-6974-4 "IBM System/360 and System/370 I/O Interface Channel to Control Unit Original Equipment Manufacturers' Information" on pages 7 et seq. (dated 1978). All operations, control and data transfers conducted between the host processor and any peripheral device require that the peripheral device be "selected". "Selected" is a term that means that one and only one of the peripheral devices on any one daisy-chain connection can be active with the host processor at a given instant of time. This restriction does not prevent daisy-chain-connected peripheral devices from performing so-called "free-standing" operations during the same instant of time, i.e., operations that do not require host supervision. Examples of such free-standing operations are rewinding tape in tape recorders, seeking tracks in disk recorders, performing diagnostic functions, and the like.

Levy et al. patent U.S. Pat. No. 3,999,163 shows peripheral-device-to-control-unit connections termed "synchronous" and "asynchronous" which correspond largely to the data buses and tag lines of Moyer et al., supra. Still, no action occurs between the peripheral device and the control unit without a device selection which identifies a peripheral operation with one, and only one, peripheral device.

The U.S. patent to Bauer et al. U.S. Pat. No. 4,423,480 shows control-unit-to-peripheral-device connections having three portions, a first portion for transferring data, a second portion consisting of tag control lines which includes a device selection line (Select Out) which enables the usage of the data lines (first portion) and the other tag control lines in the second portion. A third portion of each such connection transfers commands from the control unit to any addressed peripheral device on the same daisy-chain connection independently of the selection for enabling preparatory actions by the various peripheral devices independently of device selection. This arrangement allows overlapping the peripheral data transfers with preparatory actions (tape motions, etc.) without requiring the preparing addressed peripheral device to be selected for a peripheral operation. A significance of this arrangement is that the preparatory actions can be initiated with one device while another device is selected for transferring data with a controller or host processor.

In spite of all of the advances and flexible connections and controls mentioned above, a need still exists for yet a simpler and lower-cost device connection, including a small number of electrical lines extending between the controlled and controlling units and that still provides flexible device controls. Such simplicity and low cost are important to success of peripheral subsystems which attach to low-cost host processors, including the so-called personal computers.

SUMMARY OF THE INVENTION

It is an object of the present invention to provide an extremely simple, but effective, peripheral data-handling subsystem.

In constructing a data-handling subsystem, particularly one for storing data, a simple but flexible interconnection arrangement is provided between a controller and a peripheral device. Such arrangement is applicable to any type of peripheral device. The interconnection includes a set of "individual" connection lines going from the controller individually to the respective peripheral devices. These individual lines carry signals indicative of data processing operations to be performed by the controller and the individual devices, respectively. A second set of lines, termed "omni lines", extends from the controller to all of the devices. Such omni lines carry control information for indicating a data processing operation to be carried out primarily by the addressed device when sent from the controller, or by the controller when sent from the addressed device. The omni lines also carry device address information for indicating which of the omni-connected devices is associated with the respective signals. Typically, command signals are sent by the controller to the device, while status or other data signals requiring action by the controller are sent by the devices to the controller. A third set of lines is activated by a select signal supplied by the controller over an individual line to a peripheral device which will use the third set of lines in an upcoming data processing operation. Control circuits for the third set of lines in the device and controller are activated when that select signal is active. This third set of lines includes data-carrying lines for transferring data between the controller and a selected peripheral device. The third set also carries timed control signals such as, in a disk storage device, index and sector pulses to the controller, retrace control signals and seek controls from the controller to the selected peripheral device, a selective reset control line, and write and erase gate control or enable signals supplied by the controller to the device in a timed relationship to data to be recorded or otherwise processed by the peripheral device.

In a preferred embodiment of a peripheral storage subsystem using the invention, a peripheral device is an optical disk recorder adapted to operate with an optical disk having a spiral recording track. The optical disk recorder is arranged to retrace a single circumvolution of the spiral continuously unless the controller sends an inhibit retrace signal to the selected device, whereupon the device will track the spiral so long as the inhibit retrace signal is active at a so-called index time. The controller cooperates with the peripheral devices through the interconnection for facilitating recovery from error conditions, as well as efficiently operating the device for recording data and reading data from an optical data storage disk. The controller is particularly adapted to attach to a host processor.

Typically, the controller includes a programmed microprocessor, as does each of the peripheral devices. The arrangement is such that a minimal number of lines extend from the controller to the respective peripheral devices for minimizing cost, with the control signals and data signals flowing between the controller and the devices for minimizing logic requirements in the peripheral device.

The foregoing and other objects, features, and advantages of the invention will be apparent from the following more particular description of the preferred embodiments of the invention, as illustrated in the accompanying drawings.

BRIEF DESCRIPTION OF THE DRAWINGS

FIG. 9 illustrates detection of index marks, sector marks and demarked sectors in the FIG. 1 illustrated data storage subsystem.

FIG. 10 illustrates controller functions employed in a track seek operation for the FIG. 1 illustrated data storage subsystem.

FIG. 11 illustrates device functions related to retrace control for the FIG. 1 illustrated data storage subsystem.

DETAILED DESCRIPTION

Figure 1:
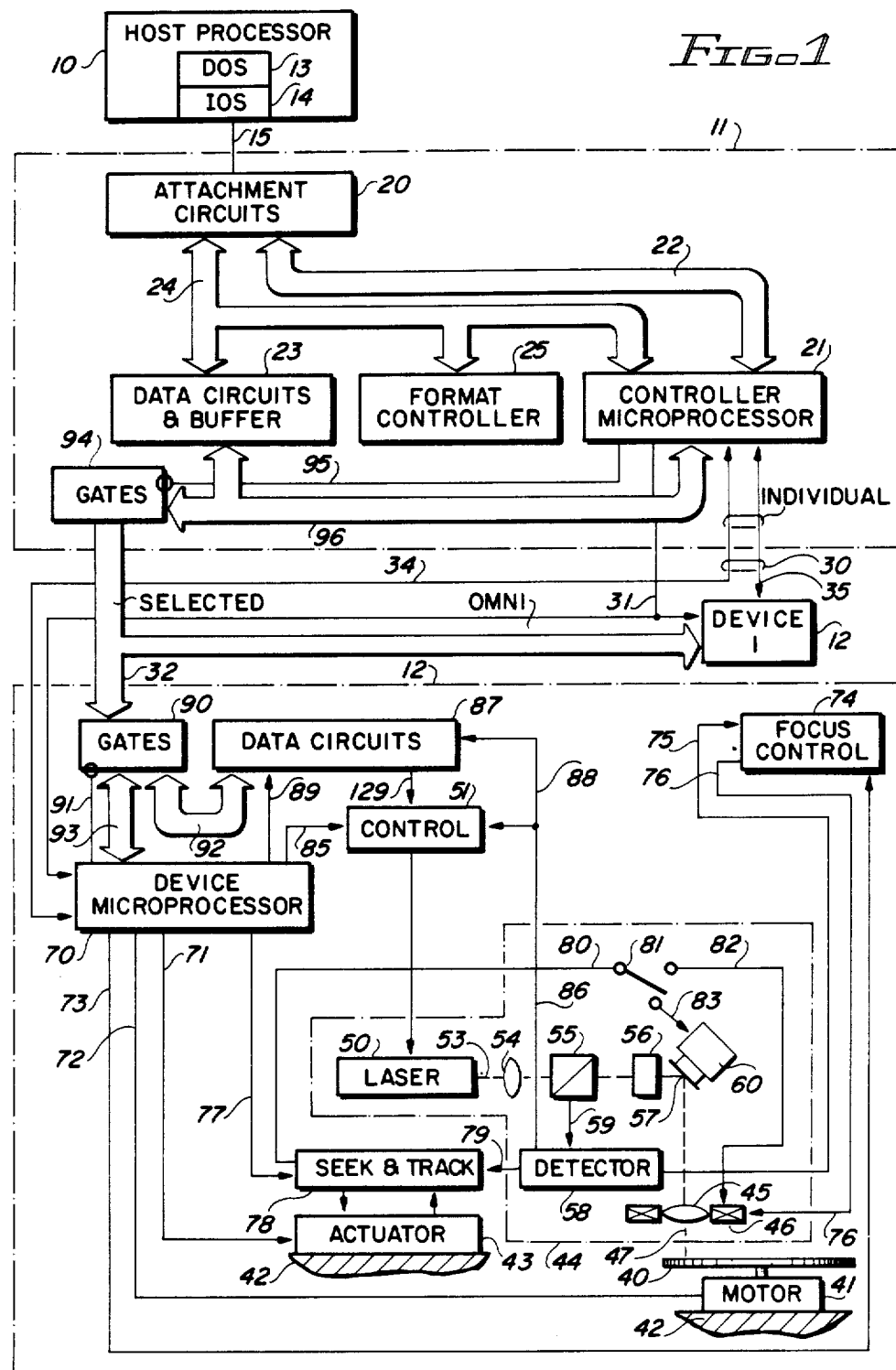
FIG. 1 an overall block diagram of a data storage subsystem embodying the present invention.

Referring now to the appended drawing, like numerals indicate like parts and structural features in the various diagrams. A host processor 10 is connected to a data storage subsystem, including controller 11, having at least one peripheral device 12. As shown in FIG. 1, controller 11 has two attached devices 12; each of the devices 12 is an optical data storage recorder, as later described. Host processor 10 includes a set of operating programs, as well as application programs (not shown), which need access to data storage devices for storing and retrieving data. Access to the data storage subsystem is through two operating system programs. The first is DOS 13, a disk operating system such as DOS that is used with the IBM Personal Computer (PC) sold by International Business Machines Corporation. DOS 13 cooperates with IOS 14, an input/output program, which provides access to controller 11 via a host-to-subsystem interconnection 15. IOS 14 can be BIOS on the PC, supra, while connection 15 is the PC input/output connection.

Controller 11 consists of a circuit board of electronic circuits for coupling host processor 10 to any one of the devices 12 and includes attachment circuits 20 for providing communications with host processor 10 in the usual manner. Controller microprocessor 21 is connected to attachment circuits 20 by bus 22 for receiving host processor 10 issued commands and parameter data, such as track address, device 12 address, and so forth, and for supplying status information from controller 11 to host processor 10. Such status information includes error conditions, busy conditions and the like. Data circuits and buffer 23 operate in a known DMA (direct memory access) mode for transferring signals between the main memory or data storage sections (not shown) of host processor 10 and the buffer (not shown) in circuits 23. Circuits 23 also include data modulating and demodulating circuits for connecting data between a form suitable for recording on an optical disk and a form suitable for data processing in host processor 10. Bus 24 intercouples attachment circuits 20, controller microprocessor 21 and data circuits and buffer 23.

Optionally, a format controller 25 may be included in controller 11 which consists of electronic circuits specifically designed to format signals on a soft-sectored record storage disk, as is well known for disk and tape storage devices. Format controller 25 is coupled via bus 24 to circuits 23 and to controller microprocessor 21. Format controller 25 then controls the data circuits and buffer 23 for supplying unique format signals via the data-modulating circuits to the record member (disk or tape) in a device 12. These format signals may include preamble or synchronization signals, embedded track addresses, sector addresses and the like, as is well known in the data recording art.

The interconnection between controller 11 and devices 12, also identified as device 0 and device 1, is divided into three logical portions. A first portion 30 has individual connections from the controller 11 to the respective devices. Such individual connections are for device selection and for alerting the controller by the individual devices to particular device status changes. The effect of the signals transferred over the individual connection to the respective devices 12 results in data processing operations that are jointly conducted by the controller and the devices. A second portion 31, called the omni connection, connects the controller 11 to all of the devices 12. The signals travelling over connection 31 include device address signals for identifying the source and destination for accompanying control and status signals. Typically, the omni connection is for transferring predetermined control information-bearing signals, which require either the controller 11 or the addressed device 12 to perform data-processing-related functions. Such individual data processing functions can result in later-performed joint data processing functions employing third connection portion 32—the selected device connection.

The selected device connection 32 provides for data transfers between controller 11 and devices 12 only after controller 11 has selected a device 12 using one of the individual connections 30. For example, numeral 34 denotes the individual connection from controller 11 to device 0, which enables selection of device 0 when device 0 is to operate with controller 11 in the selected mode. In a similar vein, numeral 35 indicates the individual connection from controller 11 to device 1 for making it a selected device for enabling it to use selected connection 32.

Each of the devices 12 are identically constructed. Device 0 is shown in detail as being an optical disk recorder employing a usual optical disk 40 (the disk 40 format is shown in detail in FIG. 4) removably mounted on a shaft of disk drive motor 41. Motor 41 is suitably mounted on a frame 42 (diagrammatic) of device 0. Head arm 44 is supported by actuator 43, also suitably mounted on frame 42. Head arm 44 moves radially of disk 40 under control of actuator 43 for accessing various radial positions of a spiral track on disk 40. Concentric tracks may be employed. Head arm 44 supports the illustrated optical components for recording and reading data to and from optical disk 40.

The recording and read-back light beams are focused onto disk 40 by objective lens 45 suitably mounted in focusing mechanism 46. Objective lens 45 not only transmits light over light path 47 to disk 40, but also receives the reflected light which traverses the same path which, as is well-known, enables the read-back data detection, focus and tracking functions.

The light source is preferably monochromatic, as provided by a solid-state laser 50 suitably controlled by control circuits 51 which include WRITE signal modulation for recording signals on disk 40 and reduced light intensity during read-back of data from disk 40. Laser 50 emits a linearly polarized monochromatic light beam 53 to be collimated by optics 54. Polarization-type beam splitter 55 receives the collimated light from optics 54 and transmits the light through quarterwave plate 56, then to tracking mirror 57. Mirror 57 reflects the light beam to objective lens 45 for transmission to disk 40. The disk 40 reflected light is in turn reflected by mirror 57 through quarterwave plate 56, thence reflected by polarized beam splitter 55 to photodetector 58 over light path 59.

Tracking and focus control are achieved using state-of-the-art techniques. For example, one form of tracking beam 47 to a track on disk 40 is to pivotally adjust mirror 57 by control 60. Alternately, focusing unit 46 may provide objective lens 45 with three degrees of motion for providing tracking functions in addition to the focusing function.

The operation of all of the elements in the devices 12 is respectively controlled by a device microprocessor 70, which contains microprograms implementing the supervision and control of the devices in accordance with known state-of-the-art techniques. The control connections between device microprocessor 70 and the components of device 0 are simplified for ease of understanding. Control line 71 extends from device microprocessor 70 to head arm actuator 43 for enabling the actuator to respond to later-described seek and track circuit 78 supplied signals. In a similar manner, control line 72 extends from device microprocessor 70 to disk rotating motor 41 for turning it on and off. In some embodiments, it may be desired to vary the rotational speed of disk 40. In such situations, device microprocessor 70 alters the speed of motor 41 in a desired manner. Control line 73 extends between device microprocessor 70 and focusing control 74 for actuating the focusing functions. The actual focusing servo loop includes a focus error signal supplied by photodetectors 58 over line 75 to focus control 74. Focus control 74 analyzes the supplied line 75 signal for actuating focusing unit 46 over line 76 to maintain focus of the light beam at disk 40.

Seek and track circuits 78 are actuated to perform track seeks by control signals supplied by device microprocessor 70 over line 77. For example, device microprocessor 70 receives an indication from controller 11 that a particular radial position of the spiral track is to be accessed. Controller microprocessor 21 determines the current position of the head arm 44, as will become apparent, and calculates the delta or distance between the current radial position of head arm 44 and the desired position. This delta, or distance to SEEK, is transferred to seek and track circuits 78 which respond by actuating the actuator 43 to move head arm 44 radially to the desired radial position. Once at the desired position, the usual tracking controls are instituted. Such tracking controls include circuits 78 receiving tracking error signals over line 79 from detector 58 for determining the radial position of the light on light path 47 with respect to a spiral track portion currently being scanned by the light beam focused on disk 40 by objective lens 45. The tracking servo loop is closed for tracking by sending control signals from seek and track circuits 78 over line 80 to either control 60 or to a mechanism 46, as selected by switch 81. When switch 81 is set at terminal 83, mirror 57 performs the tracking, while when switch 81 connects lines 80 and 82, element 46 performs the tracking. In a practical embodiment, either the mirror or the element 46 would do all of the tracking.

Additionally, device microprocessor 70 controls the laser 50 intensity and on-off conditions by sending control signals over control line 85, which activates control 51 to control laser 50 in a desired manner. Detector 58 supplies intensity-indicating signals to laser control 51 over line 86 such that the intensity of the laser 50 emitted light beam can be automatically controlled.

Data and format control signals for disk 40 are generated and detected by format and data circuits 87. Detector 58 supplies data-indicating signals over line 86, thence line 88, to data circuits 87. Data circuits 87 are supervised and managed by device microprocessor 70 as indicated by control line 89. Data circuits 87 supply the sensed signals to the demodulating circuits (not shown) of data circuits and buffer 23 in controller 11, as will be described.

Data is transferred between controller 11 and device 0 using selected connection 32. Device microprocessor 70 responds to the controller 11 select signals, later described, supplied over individual connection 34 to enable a set of gates 90 via enable control line 91 to pass data signals between data circuits 87 and controller 11. Data bus 92 connects data circuits 87 to an analog gating means (not shown) in gates 90, while device microprocessor 70 is connected via bus 93 to gates 90 for transferring control information during the selected mode, as will become apparent.

Controller 11 has a similar set of controls for communicating with the devices in the selected mode. Such controls in a practical embodiment will be dispersed in various circuits and will be actuated by control signals, not necessarily termed selected control. For example, controller microprocessor 21 may have a program-controlled input and output register (not shown). The control program determines the signals that are put into the input/output register, and hence such a program can perform the later-described gating functions. Gates 94 logically represent such program control, as well as physical circuits within controller 11 that may be employed to implement the described operations. Gates 94 couple selected connection 32 to internal bus 96 of controller 11 when enabled by an enable signal on control line 95 received from controller microprocessor 21. The enabled gates 94 pass the selected mode signals, later described, over the selected connection 32 to gates 90 in all devices 12. One, and only one, of the devices 12 is enabled by its select signal on the individual connection 34, 35 for enabling its respective gates 90 for completing the selected connection. Gates 94 direct the analog read-back signal from data circuits 87 to data circuits and buffer 23 while directing later-described format and control signals to controller microprocessor 21.

Connection 15, extending between host processor 10 and controller 11, typically will have different controls and data paths and employs a larger number of signal lines. For example, connection 15 can include a twenty-bit address bus for selecting the peripheral data storage subsystems attached to host processor 10. An eight- or sixteen-bit data bus may be employed in addition to the address bus. Control tag lines are also included, such as a read-enable line, write-enable line (respectively causing data to be transferred from the storage subsystem to the host processor and in the reverse direction), memory read line, address-enable line, DMA control line, interrupt line and reset line, all as are currently practiced in the art.

Figure 2:
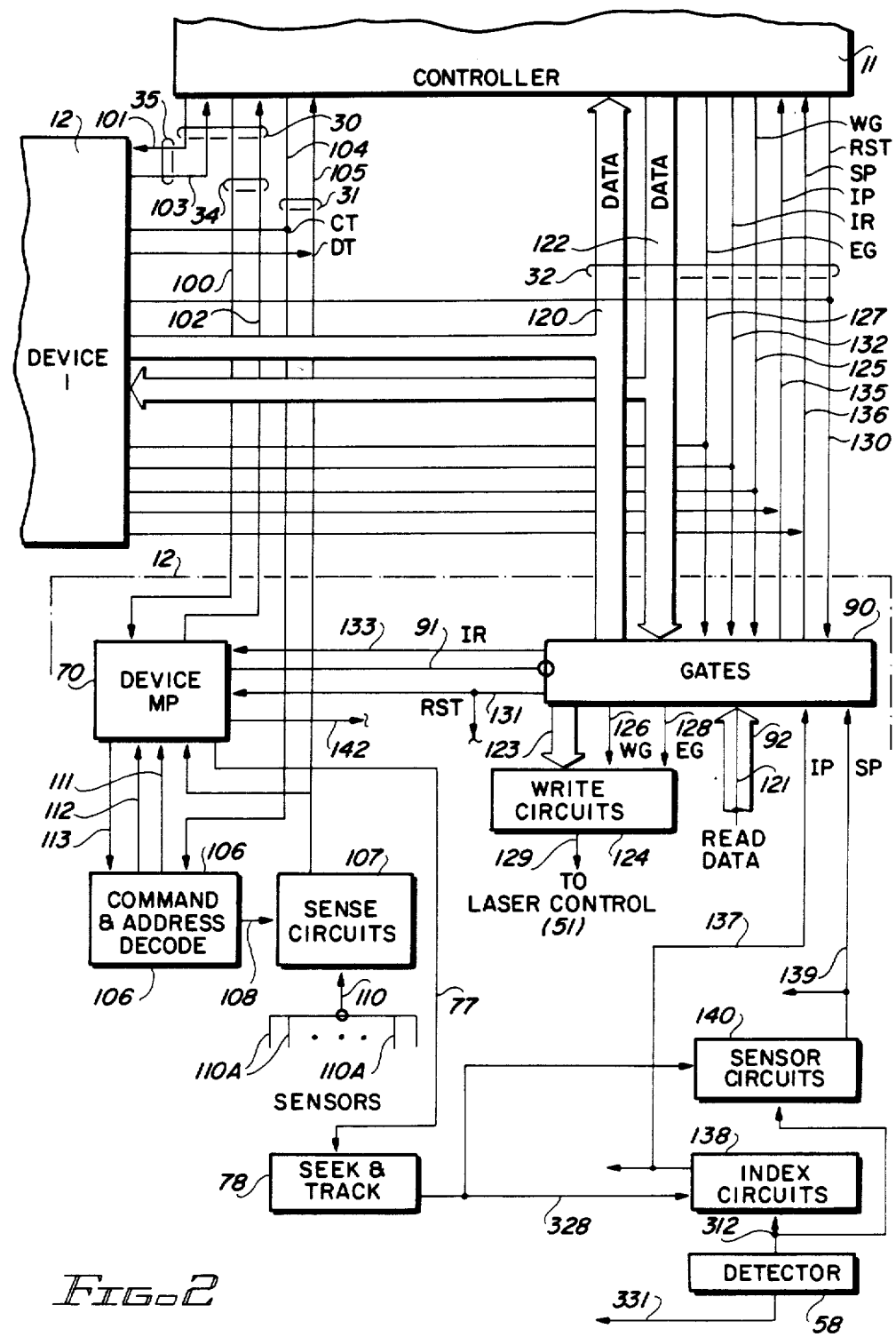
FIG. 2 is a detailed showing of a controller-to-device interconnection used in the FIG. 1 illustrated data storage subsystem.

Referring now to FIG. 2, the individual connections 30 each are shown as consisting of two control lines extending respectively from the controller 11 to devices 12. Select lines 100, 101, respectively connected to devices 0 and 1, carry one SELECT signal from controller 11 to one, and only one, of the devices 12. The SELECT signal, when active, continually indicates to the selected device 12 that it is the one, and only one, selected for a data transfer with controller 11. As mentioned earlier, when a device 12 is selected, then the selected connection 32 is employed for effecting those data transfers.

The individual connections 34, 35 respectively include alert lines 102 and 103 extending from the respective devices 12 to controller 11. The alert lines carry signals from the respective devices 12 to the controller 11 for indicating status changes which may indicate required subsequent joint actions between controller 11 and the alert-signal sending device 12. Each alert signal can be encoded to indicate the reason for the alert. The SELECT signal is an indication to a selected device 12 that subsequent joint data processing operations are to ensue.

Omni connection 31 consists of a pair of signal-carrying lines 104 and 105 which extend from controller 11 to all attached devices 12. Line 104 carries control signals from controller 11 to all of the devices and is termed controller transmit (CT). In a similar fashion, line 105 (device transmit DT) carries control information, such as device status, from any of the devices 12 to controller 11. The format of the signals is described later with respect to FIG. 3. Embedded with the omni connection 31 signal transfers is a device address for indicating the destination of the controller 11 omni transmissions or the source of the device 12 omni transmissions. Accordingly, each of the devices 12 includes command and address decode circuits 106, which either can be electrical circuits or can be programmed within device microprocessor 70. Sense circuits 107 respond to controls supplied by command and address decode 108 or device microprocessor 70 to transmit status information over line DT 105 to controller 11, as later detailed, and to device microprocessor 70. Each device 12 includes a plurality of status sensors 110A, which can include error detection and correction circuits for generating sets of sense signals supplied over line 110 to sense circuits 107 for storage awaiting transmission to controller 11 over line 105. Again, sense circuits 107, in fact, can be a program within device microprocessor 70. When command and address decode function 106 is embodied in electronic circuits, interrupt-carrying line 111 extends to device microprocessor 70 for interrupting same when a command is received over line 104 from controller 11. Subsequent to the receipt of a controller 11 issued command, decode 106 and device microprocessor 70 cooperate over a set of control lines 112, 113, providing functions in accordance with the current state of the art, as may be desired for devices 12.

Selected connection 32 includes the largest number of lines extending between controller 11 to all devices 12. Each set of gates 90 in each of the respective devices 12 includes a separate gate for each of the lines. The select line 100 extending from controller 11 to device 0 goes to device microprocessor 70. Device microprocessor 70 responds to the continuous SELECT signal to supply an enabling signal over line 91 for enabling all of the gates within the set of gates 90 for transferring signals over the signal lines, next described. Read data from disk 40 is transmitted over line 120 (shown as a cable) to controller 11. Line can be either a single conductor or a set of conductors for parallel data transfer. Read data is supplied from data circuits 87 (amplifiers, compensation circuits, and the like) to a read gate (not separately shown) of gates 90 over read data line 121 within bus 92 (FIG. 1) for transmission over line 120 to controller 11. Write data to be recorded on disk 40 is supplied by controller 11 over write data line 122 (shown as a cable) to the device gates 90, thence over line 123 (shown as a cable) to write circuits 124 which are a part of format and data circuits 87. The gating of the data to be written on disk 40 is provided by an enable signal called a write gate (WG) supplied over line 125 through gates 90, thence over line 126 to write circuits 124. The WG signal is active while data signals are being supplied by controller 11 to the selected device 12. The timing of write circuits 124 by a timing signal associated with the data being transmitted is well known. Thence, circuits 124 (a part of data circuits 87—FIG. 1) transmit data-modulated signals for recording on disk 40 over line 129 to laser control 51. It may be desired to eradicate or erase data previously recorded on disk 40. To this end, eradicating data is sent over write data line 122, as enabled by a write gate WG signal supplied over line 127. These signals are passed by gates 90 respectively over lines 123 and 128; otherwise, the operation is the same as described for recording data. Erasing may cause additional modulation to occur within write circuits 124 to assure eradication of the previously recorded data on disk 40 for data security purposes. Accordingly, it is shown how the selected signal enables data transfers between a selected device 12 and controller 11.

In addition to the intimate timing required for the recording data, the selected mode enables transferring data signals between controller 11 and a selected device 12 that relate to the formatting and control of the formatting of data recorded on disk 40. A selective reset of all of the electronic control circuits in a selected device 12 is provided by a signal carried over line 130 (also termed RST) from controller 11 through gates 90, thence over line 131 to device microprocessor 70 and to all of the other electronic control circuits within the selected device 12. Control line 142 extending from device microprocessor 70 indicates other connections between the microprocessor 70 and the various elements of the device 12 electronic control circuits.

In a normal mode of operations of the devices 12, a single circumvolution of the spiral track on disk 40 is continuously scanned. Such continuous scanning is called retracing. Under certain conditions, as will be explained, such retracing is inhibited to allow a limited and controlled spiral scan of selected portions of the spiral track for multiturn data transfers and for error recovery purposes. A multiturn data transfer includes transferring a plurality of sectors of data, even a fewer sectors that can be stored in one circumvolution, and includes scanning a later-described index mark 214 (FIG. 4) on disk 40. The inhibition of the normal mode of retracing is provided by the timed control signal "inhibit retrace" (IR) traveling over line 132 through select gates 90, thence over IR line 133 to device microprocessor 70. Device microprocessor 70 responds to the inhibit retrace control signal to actuate seek and track circuits 78 not to retrace the current circumvolution, as will be detailed later.

The selected device 12 also transmits format-indicating signals (index and sector pulses) to controller 11 for facilitating recording data on and reading data from disk 40. Line 135 carries so-called index pulses (IP) while line 136 carries sector pulses (SP) from gates 90 to controller 11. The index pulse identifies the index or fiducial location indicating a particular rotational position of disk 40 with respect to the head arm 44. This point on the disk 40 demarks two adjacent circumvolutions. Index circuits 138 supply index pulses derived from an index mark on disk 40 over line 137 to gates 90 and to other elements of the electronic control circuits of device 12, such as circuits 87 and device microprocessor 70. The index detection is explained later with respect to FIG. 9. There is one index pulse between each and every adjacent circumvolution of the spiral track on disk 40.

Each circumvolution or turn of the spiral is divided into a plurality of equal-size data-storing angular sectors defined by sector marks. Sector circuits 140 detect the sector mark signals supplied from detector 58 and as explained with respect to FIG. 9. The detected sector pulse (SP) is supplied over line 139 to select gates 90 for transmittal to controller 11. Controller 11 evaluates the received sector and index pulses for synchronizing data transfers to the disk 40 format shown in FIGS. 3 and 4. Optionally, IP and SP may be supplied to other elements of the device electronic control circuits, such as device microprocessor 70. Circuits 138, 140 are a part of the data circuits 87.

Figure 3:
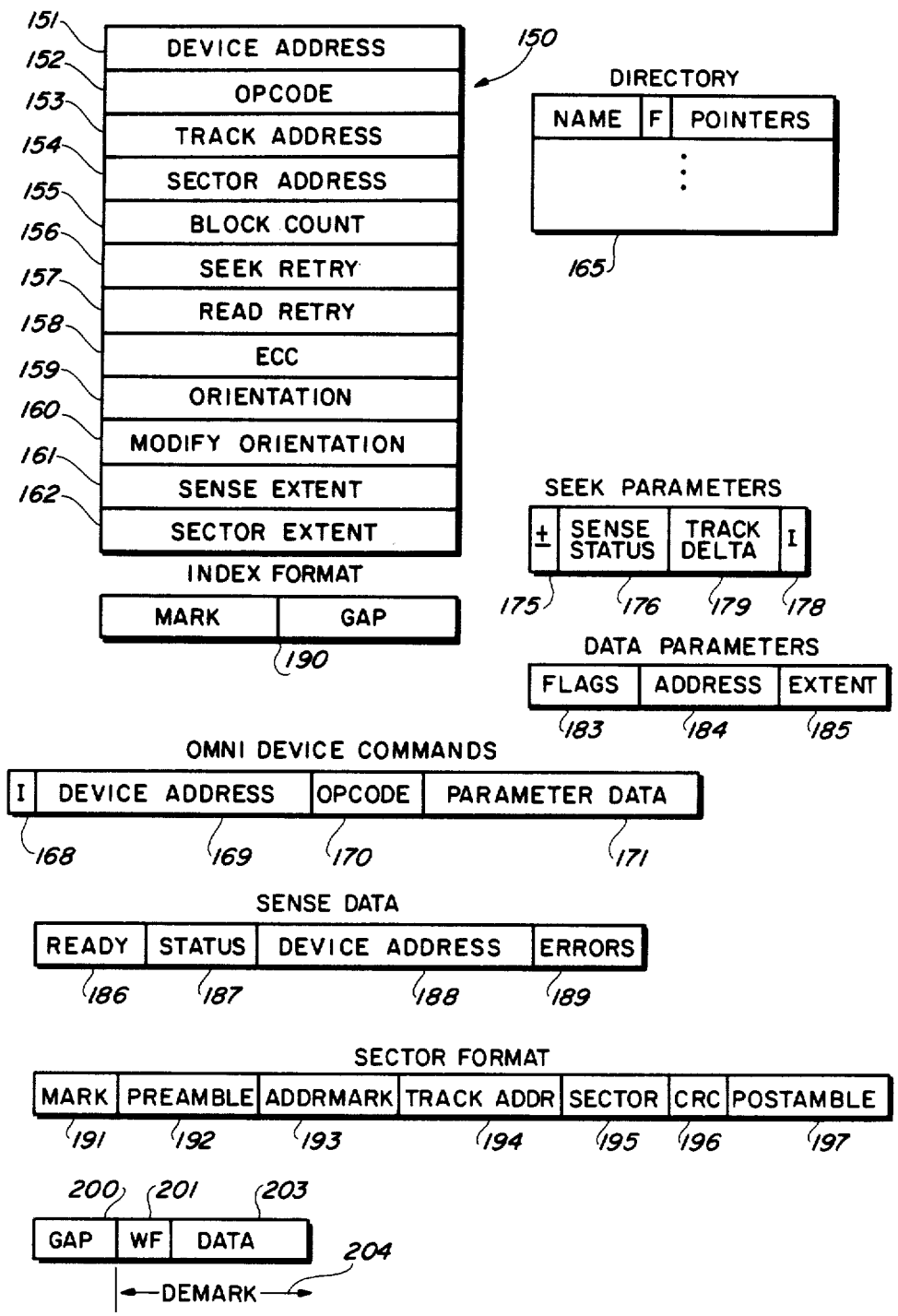
FIG. 3 shows controller data structures used in the Figure 1 illustrated data storage subsystem which assist in an understanding of the present invention.

Before going into the details of subsystem operation, the various data structures used in the data storage subsystem and needed for an understanding of the invention are described with particular reference to FIG. 3. Control communications from host processor 10 to controller 11 are through a so-called device control block DCB 150, which is supplied to controller microprocessor 21 for command decoding and other control functions, as will become apparent. The DCB is stored in controller 11, as will be described, within controller microprocessor 21. For logically controlling the commanded function, each DCB 150 includes a device address 151. OP code 152 indicates the operation to be performed by the command contained within each DCB. Track address 153 indicates a first radial position on disk 40 associated with the OP code 152. In the event disk 40 is not involved in the commanded function, then track address 153 is all zeros. Similarly, sector address 154 indicates which data-storing sector of the addressed circumvolution, or track address, is the first sector to be accessed for data transfer or other disk 40 related functions. Block count 155 indicates the number of sectors to be accessed subsequent to the sector identified in sector address 154. Block count 155 is comparable to a storage-extent indicator. Seek-retry bit 156 indicates whether or not a seek retry is to occur after a track-seek error. When the retry bit is reset to zero, then a predetermined number of seek retries are automatically effected by controller 11. In a similar manner, read-retry bit 157 inhibits or commands a read retry in case an attempted read of data from disk 40 is unsuccessful, i.e., the error correction code (not described) associated with the recorded data is unable to correct the data. ECC bit 158, when set to the active condition, signifies that no error detection and correction is to be performed on the data, but that the data, with its error correction redundancy, is to be sent to host processor 10 without correction. This latter function is a state-of-the-art recovery technique for disk files of the magnetic type.

Angular orientation bit 159, also referred to as bit "q", commands the addressed device 12 to perform rotational or angular orientation according to different procedures. When q=0, rotational orientation to an addressed sector on disk 40 is achieved using the sector and track addresses in registers 154 and 153, respectively, of DCB 150. However, when q=1 and the command is a READ or READ-VERIFY, a SEEK is issued by controller 11 to the addressed device 12 to the track address 153 (the DCB target track) minus one (which now is the addressed track)—the track immediately adjacent the target track but closer to the outer periphery 210 (FIG. 4) of disk 40. When q=1, retrace is inhibited by controller 11 activating line IR 132. Rotational position orientation is made to the target sector minus one (which now is the addressed sector). When controller 11 senses arrival of the addressed sector to sensing head 216 (Figure 4), controller 11 times the disk 40 rotation so that the data portions 201, 203 (FIG. 3) of the addressed sector and the sector mark portion 191 (FIG. 3) of the target sector pass under sensing head 216. Controller 11 then senses the beginning of the later-described data portion of the target sector without detecting a sector mark for the target sector. Modify orientation register 160 contains a single bit "p" which alters angular orientation from target sector minus one to target sector minus two. The modification can be used for error recovery purposes, as will become apparent. Register 161 contains the extent desired for sense data to be sent to host processor 10. At a minimum, two extents are provided: either full extent (value=0) or an abbreviated sense extent (value=1) is specified. In another embodiment, the extent contains the number of sense bytes desired. Register 162 contains an indication of the number of bytes to be stored in each of the data-storing sectors of disk 40. This disk 40 related format command parameter enables the subsystem to accommodate various data formats in diverse host processors.

Optical disk 40 can store a large amount of data. It is preferred that a directory to such stored data be recorded on disk 40 for enabling rapid access to such data. Directory 165 indicates contents of one such type of directory. The NAME field indicates the name of the data set or records stored in the optical disk 40 at sector and track addresses indicated by the field named POINTERS. The status of the pointed-to sectors and other control information is recorded in field F, which is an abbreviation for "flags". Various forms of directories can be used. Any sector in disk 40 not listed in a directory is unaddressable. No sector is listed until it receives data for storage. Similarly, an error-prone sector need not be listed in the directory for preventing normal accessing to such a sector.

Various host-processor-issued commands are embedded in DCB 150. An addressed device 12 can be selectively reset. A READ-SENSE command addressed to one of the devices 12 causes accumulated sense data stored in controller 11 and the addressed drive to be transferred to host 10. Such sense data includes error indications, changes in status (such as a record disk 40 either has been removed or inserted into the addressed device 12), whether or not the addressed device can accept commands from controller 11, the address of the device 12 sending the sense data, whether or not interrupts are enabled in controller microprocessor 21, the type of disk 40 (size, lineal recording density, track density, characteristics of the recording coating on the disk, write protection), and the like. A READ-VERIFY command is normally issued immediately after data has been recorded on disk 40. No data is actually transferred from the data storage subsystem to host processor 10 by this command. The controller causes the addressed device 12 to read the just-recorded data, the controller verifies that it, in fact, is readable. Normally, the data circuits 87 operation is modified to an error-prone condition such that the quality of read-back during read-verify can be lower than normal read-back operations. Such error-prone conditions can be achieved by merely changing detection thresholds. A READ command commands the subsystem to transfer data recorded on disk 40 to host processor 10. Similarly, a WRITE command causes data to be recorded on disk 40 that is supplied from host processor 10. A SEEK command causes the addressed device 12 to move its head arm 44 to a specified circumvolution of the spiral track. Diagnostic commands are also employed. A READ-SUPPRESS command causes the transfer of data along with the error detection and correction redundancy directly to host processor 10, i.e., the error correction capabilities normally found in controller 11 are inhibited. A DEMARK command causes an indication to be recorded in the addressed data sector of disk 40 in the addressed device 12 for indicating that such sector is not available for data recording or data reading. READ TRACK ADDRESS causes the transfer of the address of the circumvolution or track currently being scanned in the retrace mode by the addressed device 12. Additional host processor 10 commands can be employed in a practical embodiment.

In executed the described host processor 10 issued commands contained in DCB 150, controller 11 generates its own commands and supplies them to the addressed device 12 over the omni connection 31.

Once controller 11 has received DCB 150, it responds to the command via programming in controller microprocessor 21. Controller 11 execution of host-issued commands includes issuing device commands to the addressed device 12. These device commands are supplied by controller 11 over the controller transmit line CT 104, which extends to all of the devices 12. All of the commands issued by controller 11 require the immediate attention of the addressed device 12. The device commands vary in length from two to four bytes. Some device commands require more parameter data than others, hence the variable length. As shown in FIG. 3, interrupt bit I 168, when set to unity, interrupts the device microprocessor 70; otherwise, device microprocessor 70 of the addressed device 12 will examine the controller 11 transmitted device commands. Examples of commands that require interruption of device microprocessor 70 are those associated with real-time operations, such as some seek commands, laser level control commands, and the like. Device address field 169 identifies the device 12 which is being addressed. OP code 170 contains a bit pattern signifying to the addressed device 12 what functions are to be performed. Some of the OP codes 170 require additional information for device 12 to perform the commanded functions. Accordingly, parameter data 171 is included in the device commands.

The various OP codes 170 for the device commands include the following defined functions. A SEEK command, which can be positive or negative, commands the addressed device 12 to move the head arm 44, either toward the center of the disk 40 (a positive seek) or toward the periphery of the disk (a negative seek). Parameter data for the SEEK include the ± direction bit 175 (FIG. 3) and, in track delta field 179, the number of circumvolutions to be crossed (delta distance). Whether or not status is to be reported at the end of the SEEK is indicated by bit 176. Additional SEEK commands may be provided for seeking a set number of circumvolutions, such as one, four, five, ten, and the like. Other controller-to-device commands include turning the disk drive motor 41 on and off and sensing device status which requires the device to send device sense data to controller 11. Such device sense data can include a bit 186 signifying whether or not the addressed device 12 is ready to receive additional controller 11 issued commands. Status information in field 187 signifies the operational status of the device 12, as is well known. The address of the device 12 sending the sense data is indicated in field 188, while detected error conditions are identified in field 189. Such sense data is sent to controller 11 over omni connection 31. Controller 11 may also command an addressed device 12 to run diagnostic tests, enable and disable the alert line, i.e., allow or disallow the addressed device 12 from sending an alert signal, as well as requiring the addressed device 12 to send additional information about operations being performed. For transferring "user data", flags 183 indicate various operational parameters. The device 12 address is indicated in parameter field 184, while the extent, the number of blocks of data to be transferred, is contained in field 185.

The format of control information contained within a data-storing sector on disk 40 includes a sector mark 191. Sector mark 191 may be a special modulation pattern of predetermined duration or circumferential length at the beginning of each sector. Preamble field 192 has synchronizing signals for frequency and phase synchronizing the modulating and demodulating circuits in circuits 23 to the signals recorded on disk 40. Address mark 193 is a special modulation pattern signifying that the data field immediately following the mark indicates the address of the sector. Such address includes the track address in field 194 and the rotational position or sector address in field 195. CRC (cyclic redundancy code) field 196 contains an error detection and correcting redundancy for the track address and the sector address. Such redundancy can also be applied to the special patterns of the address sector marks. Postamble 197 provides for frequency and phase synchronization of the read-back, signal-timing clock (not shown) found in circuits 23. Following postamble 197 is gap 200 of a predetermined circumferential length. Following gap 200 is data field 203, which either contains recorded data or no data. Optionally, WF bit 201 indicates whether or not data is written in field 203. Preferably, the status of recording in the various sectors is kept in directory 165. Data field 203 typically will store error detection and correction redundancies. When a data field 203 is just written or has been just read (READ-VERIFY) after being previously written and errors are detected which prevent the faithful reproduction of data stored in the sector, then data field 203, within the sector, can no longer be used. Accordingly, the sector may then be demarked by supplying a predetermined demark pattern beginning at the trailing end of gap 200 and extending a predetermined distance into data field 203. The demark pattern 204 is detected by circuits 23 for signifying that the sector no longer should he used. Whenever a sector is demarked, directory 165 on disk 40 can be updated to indicate that the sector is demarked. New directory entries made for the data set associated with the sector just demarked will have the sector identification deleted. However, in write-once media, the older directory remains and, therefore, the demark indicator in field 204 is essential for data integrity.

As mentioned earlier, each disk 40 has a single radial index line identifying a unique rotational position on the disk called index. Numeral 190 signifies the index format used on the disk 40 to include two fields, a mark and a gap field. The mark field, also called index mark, corresponds to the sector mark 191 of the sector format. The same modulation pattern may be employed with the circumferential length of the index mark being twice that of the circumferential length of a sector mark. Other modulation or unique data patterns may be employed as well. Following the index mark, a gap of predetermined length occurs. The gap is a so-called jumping gap for allowing, during retrace, the light beam path 47 (FIG. 1) to be moved back to the beginning of the circumvolution currently being scanned for effecting retrace.

Figure 4:
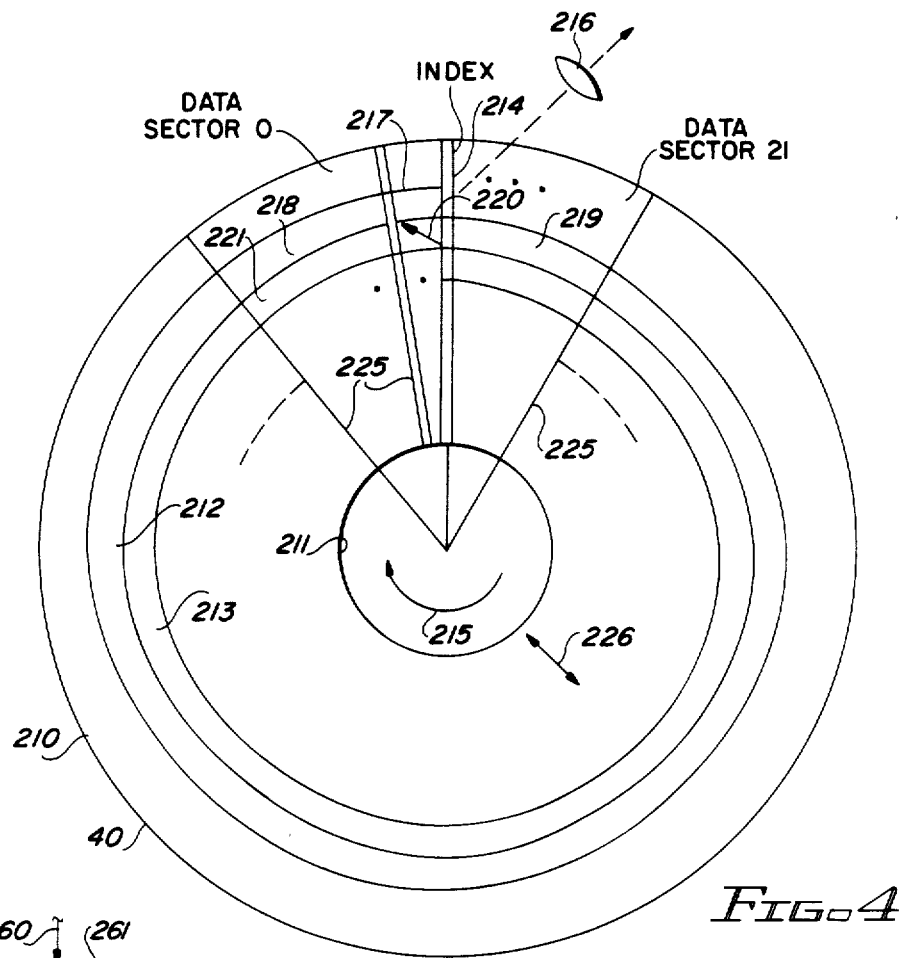
FIG. 4 illustrates the format of a disk-shaped record member used in the FIG. 1 illustrated data storage subsystem.

FIG. 4 is a simplified diagrammatic representation of the disk 40, which employs the FIG. 3 illustrated formats. Disk 40 has a radially-extending annular recording area extending between the outer periphery 210 and the inner periphery 211. It is to be understood that nonrecording areas may radiate outwardly and inwardly of the indicated peripheries.

Two circumvolutions of the spiral track of disk 40 or two concentric track equivalents are shown for illustrating the present invention. A first circumvolution 212 is a radially-outward circumvolution, while the second circumvolution 213 is a radially-inward circumvolution. The radially-extending index mark 214 provides a reference point in disk 40 which is sensed by transducer 216 as disk 40 rotates in the direction of the arrow 215 past transducer 216 (transducer 216 corresponds to the objective lens 45 in head arm 44, FIG. 1). Following index mark 214 is jumping or track-switching gap 217, which allows sufficient latency time for the light beam 47 leaving head arm 44 to be moved one track or circumvolution pitch for enabling retrace of a given circumvolution. For example, when circumvolution 212 is being scanned in the retrace mode, the scan begins at sector 218 (sector 0) immediately following the jumping gap. Light beam 47 of head arm 44 is tracked to circumvolution 212 up to sector 219 (data sector 21) which is now radially inwardly one track pitch from sector 218. To retrace the circumvolution 212, the light beam 47 of head arm 44 is moved radially outwardly from sector 219 to sector 218 within jumping gap 217, as indicated by the arrow 220. This action repeats once per disk rotation in the normal mode of operation until retrace is inhibited, whereupon, after scanning portion 219 of circumvolution 212, tracking merely continues into portion 221 of circumvolution 213. The remaining portions of disk 40 are divided into a plurality of date-storing sectors, each having the sector format shown in FIG. 3. The data sectors are enumerated from 0 through 21 and are circumferentially equally spaced around disk 40. The beginning of each data-storing sector is indicated by a sector mark 225, which corresponds to mark 191 of FIG. 3. All sector marks for the data-storing sectors have like numbers in the various circumvolutions and lie on respective common radial lines. Directory 165 is preferably stored in directory area 226 in a radially inward portion of disk 40.

Figure 5:
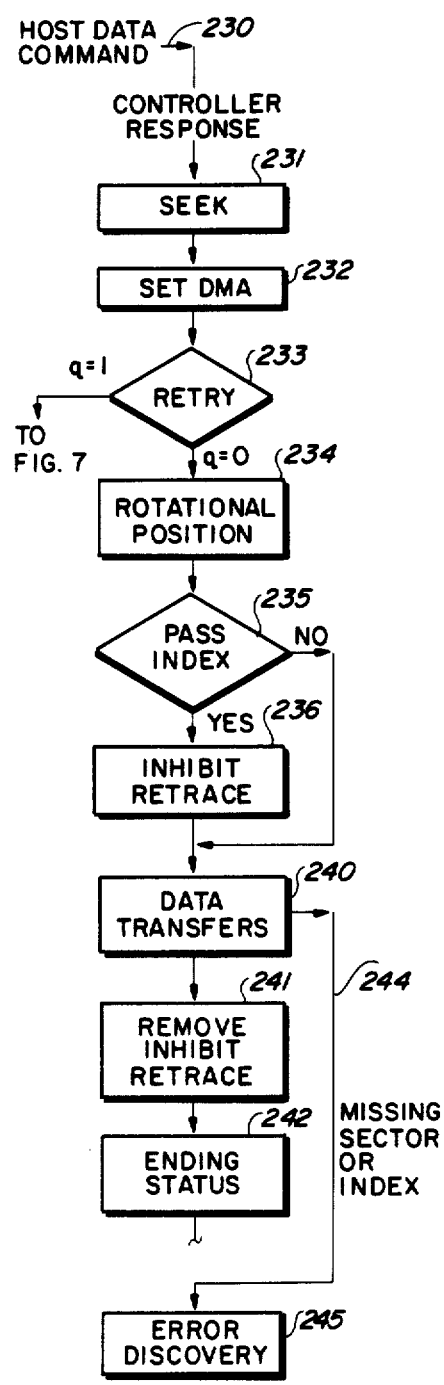
FIG. 5 is a flow diagram showing operations of the Figure 1 illustrated controller for executing a data transfer.

FIG. 5 illustrates the operational flow for effecting data transfers between host processor 10 and an addressed device 12. Numeral 230 signifies the receipt of a DCB 150 from host processor 110 by controller 11. The flowchart illustrates the controller 11 response to the receipt of one DCB. The DCB signifies a track and sector address 153, 154, which is to be accessed by the addressed device 12. The controller 11 does not know whether or not the head arm 44 is at the appropriate position. Therefore, a SEEK command is executed at step 231. Controller 11 selects the addressed device 12 and then reads the current track address from disk 40. Controller 11 then compares the current track address with the track address 153 of the received DCB. If the two addresses are equal, the SEEK is complete. If the two addresses are not equal, controller 11 issues a SEEK device command to the selected device 12 having a track delta 179 equal to the difference between the current track address and the DCB track address 153. The SEEK completes as soon as the controller 11 determines that the new current track address equals the DCB track address 153. Several device SEEK commands may be required before the SEEK completes. Then at step 232, the DMA (direct memory access) circuits are set up within controller 11 in preparation for the data transfer with host processor 10. Host processor 10 previously had set up its own DMA controls, as is known. The write gate signal on line WG 125 signals the addressed device 12 whether the operation is a read from disk 40 or a write to disk 40. Included in the controller 11 commands sent to the addressed device 12 is a laser power indicator (not shown in FIG. 3) which directs the addressed device to adjust the laser power.

Figure 7:
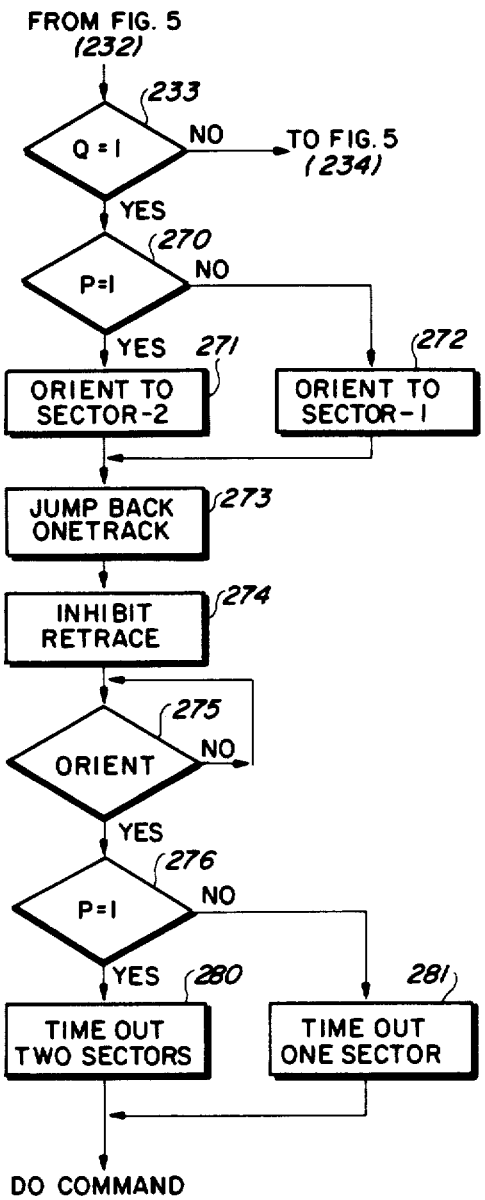
FIG. 7 illustrates a sequence of controller operations for effecting recovery from various error conditions detected and reported by the FIG. 1 illustrated data storage subsystem.

After step 232, controller 11 in step 233 determines whether or not host processor 10 is commanding a retry of an earlier command that could not be completed. A retry can be caused by any one of several error conditions. A missing sector pulse 191 (FIG. 3) or a missing index pulse 190 (FIG. 3) may result in aborting a read or write (recording) operation. In the present embodiment, host processor 10 includes programming (not described) for initiating retries which employ known retry procedures. To determine whether a retry is occurring, controller 11, in step 233, examines the q-bit portion of register 160 (FIG. 3). If q=0, then a nonretry command is being executed by controller 11. When q=1, then a command being retried is being executed by controller 11, as explained later with respect to FIG. 7. Assuming a nonretry or "0" command is being first executed (q=0), controller 11 proceeds to step 234; otherwise, it proceeds to the FIG. 7 illustrated retry steps.

After detecting that disk 40 has reached the desired rotational position in step 234, controller 11 will determine whether or not inhibit retrace is required. In step 235 controller 11 determines whether or not the ensuing data transfer will include sectors on two sides of an index mark, i.e., data is to be stored in or read from sectors in two or more circumvolutions of the spiral track 212, 213. Whenever an index mark is passed during a data transfer, retrace is inhibited. At all other times the retrace inhibit signal is inactive. When index 214 is to be paged during a data transfer, controller 11 at step 236 activates line IR 132 to direct the addressed device 12 to inhibit retrace during the data transfer. Then in step 240 the data is transferred between disk 40 and controller 11. The same data is also transferred between host processor 10 and controller 11 using known DMA techniques embodied in host processor 10. A data buffer (not shown) in controller 11 is employed in the data transfers.

For a write-to-disk data transfer, controller microprocessor 21 supplies a write gate signal over line WG 125 for a data transfer that will write data to disk 40. If the data transfer is to read data from disk 40, then WG 125 is not activated. The addressed device 12 responds to receiving a write gate signal by increasing the intensity output of laser 50 to the recording intensity level.

When the head 216 scan of an addressed sector approaches the end of gap 200 (FIG. 3), the preliminary portions of the sector format, the mark, preamble and so forth, through postamble 197, are read as a first portion of step 240 to verify that the proper sector is being accessed. Once the above-described functions have been completed, then, continuing in step 240, the "user data" is transferred at disk 40 data rate between controller 11 and disk 40 and by DMA data transfer between host processor 10 and controller 11. Controller 11 microprocessor 21 monitors the data transfer, but does not control since it operates automatically via circuits 23. Assuming the data transfer is successful, i.e., no uncorrectable errors, then any inhibit retrace is removed at step 241, and the usual ending status is reported by controller 11 to host processor 10 at step 242. The controller microprocessor 21 then proceeds to look for more work.

During any of sector searches (one search per sector involved in the data transfer) in step 240, a missing sector mark 191 may be detected, as explained later with respect to FIG. 9. If such a missing sector mark is detected, then controller microprocessor 21 proceeds over path 244 from step 240 for causing the host processor 10 to recover from the detected error condition, as indicated by box 245. The data transfer command may be aborted, and a retry by host processor 10 may be initiated. Included in such a host processor 10 initiated retry for a WRITE command is demarking certain sectors in the circumvolution having the missing sector mark. On a retry the host processor 10 again sends a DCB 150 for the WRITE command, but beginning with the data that was to be stored in the sector having the missing sector mark. All of the retry functions are controlled by host processor 10. During a read operation, transferring data from disk 40 to host processor 10, a missing sector mark or uncorrectable error causes controller microprocessor 21 to set sense data in step 245 and report it to host processor 10. Host processor 10 may respond to the sense data by issuing a READ-SUPPRESS command, which causes the data of the sector to be transferred to the host processor for possible error recovery beyond the capability of the error detection and correction circuits found in circuits 23 of controller 11.

Figure 6:
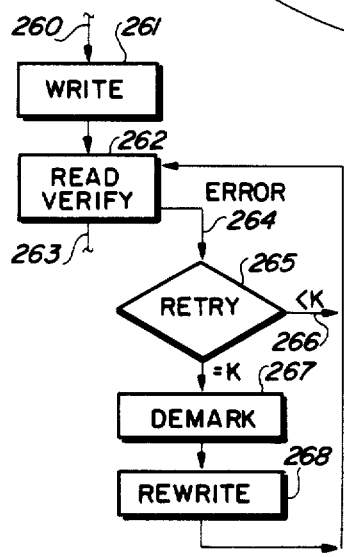
FIG. 6 illustrates host operations for generating a WRITE retry by the FIG. 1 illustrated data storage subsystem.

FIG. 6 illustrates, in simplified form, the host processor's 10 response beginning at path 260 to a reported error condition for initiating a retry following a READ-VERIFY command. Host processor 10 issues a WRITE command in step 261. Assuming the WRITE command executed by controller 11 and an addressed device 12 is successful, verification of the write is achieved beginning at step 262 by issuing a READ-VERIFY command to controller 11. READ-VERIFY, remember, reads the data just recorded in the write step 261 under error-prone conditions. If the READ-VERIFY operation is successful, host processor 10 proceeds over path 263 to perform other functions. However, if an error is detected, then path 264 is followed. In step 265, whether or not a retry is to be achieved is determined. For example, it may be decided by host processor 10 programmers that no retries will be permitted. If no retries are to be attempted or the number of scheduled retries has been completed with no recovery from the detected error, the sector or sectors in error are optionally demarked in step 267, with the data being rewritten to new sectors as determined in step 268. The allocation of sectors for receiving that data is beyond the scope of the present description, but is known in the art. In the event that a certain number of retries "K" is desired, each read retry is a reissuance of a READ-VERIFY command in step 262. A retry counter (not shown) is maintained in host processor 10 during the retries. The READ-VERIFY operation is retried at step 262 by host processor 10 following path 266 until either the number of retries equals K or a READ-VERIFY operation has been successful and passed. Similar retries for READ operations also may be employed, using the same algorithm but issuing READ commands rather than READ-VERIFY commands.

Controller 11 responds to host processor 10 commanded retries, as shown in FIG. 7. Step 233 of FIG. 5 is repeated in FIG. 7. The "q" bit portion of register 159 is examined to determine whether the received command embodied in the DCB 150 (FIG. 3) is a retry of a previously aborted command.

Host processor 10 controls retries of its commands issued to controller 11. The host processor 10 preferably includes programming for enabling the host processor to automatically analyze the sense data (not described) sent to it by controller 11. For example, if an index or sector pulse is not detected by controller 11 when executing a received command, a command being executed for reading data from disk 40 or writing data to disk 40 may be successfully completed. Controller 11 then relays the resultant sense data to host processor 10. Host processor 10 analyzes the relayed sense data and by its programming determines whether or not a retry of the aborted command is required. If a retry is required, then host processor 10 sends a new DCB 150 to controller 11 with the DCB indicator "q" active, which requires controller 11 to rotationally orient the disk access to the target sector identified in DCB 150 sector address field 154 minus one. In the present embodiment, the register portion 160 contains an extended-retry bit "p". When q=0, a normal command (i.e., not a retry) is indicated. When q=1 and p=1, rotational orientation is to the target sector minus two sectors, viz. target sector is 20, then the addressed sector is sector 18. Later-described retry actions occur for effecting recovery from a detected extended error condition. A retry from an undetected index pulse includes commanding the addressed device 12 to jump to the next-immediately-preceding circumvolution and then do a rotational orientation for the addressed sector. If both an index pulse and a sector pulse are missing, then the sector and index recoveries are both effected.

After determining a retry is needed (q=1), controller 11 at step 270 examines the "p" bit stored in register 160 to determine whether an extended retry is being conducted. In the present embodiment, an extended retry occurs only when two sector pulses 225 (FIG. 4) are missing. When two sector pulses are missing, then controller 11 times two sectors to reach the target sector. While this situation is expected to be rare, the extended retry provides for additional recovery capability. When the controller 11 time-out expires, the controller 11 senses and transfers the data portion of the target sector to the host processor 10. This action includes reading preamble 192, the address mark, the track address 194 (FIG. 3), the sector number 195, the CRC 196 and the postamble 197. The addressed device 12 head 216 then scans gap 200 to reach data area 203. Since the rotational speed of disk 40 is constant, the elapsed time required for two sectors to be scanned by transducer 216 (FIG. 4) is fixed and known; this fact enables recovery from two undetectable sector marks.

On the other hand, when "p" bit register 160 (FIG. 3) is equal to zero, then only one sector is timed over. Accordingly, the addressed sector is set to the target sector minus one at step 272. Also, the time-out is set up for timing-out over the data portion of the target sector minus one, plus the sector mark portion of the target sector. Then, from either steps 271 or 272, controller 11, at step 273, actuates the addressed device 12 seek and track circuits 78 (FIG. 2) to jump the head 216 from the addressed track to a track having the target address less one, i.e., the immediately adjacent track which is closer to the outer periphery 210 (FIG. 4) of record disk 40. The jump to the next-lower-addressed track or circumvolution enables the addressed device 12 to track follow past the index mark without a retrace, thereby enabling recovery not only from a defective sector mark or pulse, but also from an undetected index mark, all without additional programming. Once the jump to track minus one is achieved, controller 11 at step 274 inhibits retrace by activating IR line 132. Now the addressed device is scanning toward the target sector, but beginning at a next-lower-addressed track to circumvent track defects in the disk 40. Controller 11 waits at step 275 for the orientation hit, i.e., the read sector address equals the addressed sector address. The orientation hit corresponds to the sector minus two or sector minus one addresses from the target sector address, as discussed above. For a one-sector retry, p=0, resulting in step 281 being executed for the controller 11 timing-out the one sector before transmitting data to the host processor 10. On the other hand, when the "p" bit portion of register 160 is unity, then at step 280 controller 11 times-out over two sectors after the orientation hit. It is preferred that the time-outs performed in steps 280 and 281 be microcoded time-outs, as is well known. After the time-outs, the command is performed by controller 11. However, the time-outs need not occur in controller 11; the time-outs can be by a monostable multivibrator or can be performed by device microprocessor 70 within the addressed device 12. In the latter instances, device microprocessor 70 disables gates 90 over line 91. At that time, the alert line 102 is activated to indicate to the controller 11 the time-out has occurred, and gates 90 are simultaneously enabled.

Figure 8:
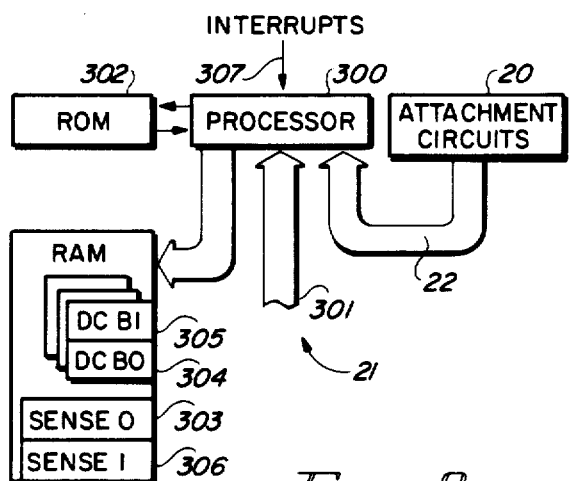
FIG. 8 is a simplified diagram of the controller microprocessor used in the FIG. 1 illustrated data storage subsystem.

FIG. 8 illustrates, in simplified form, the controller microprocessor 21 internal arrangement. A single processor chip 300, such as one including an Intel 8085 processor, or equivalent, is the heart of controller microprocessor 21. Communications with the chip 300 to elements not shown in FIG. 8 are via a bus 301, which includes the connection to bus 24 of FIG. 1. A read-only memory (ROM) 302 in processor chip 300 contains microprograms or programming for enabling processor chip 300 to execute functions for enabling controller 11 to perform the previously-described flowchart-illustrated controller 11 functions. Controller microprocessor 21 also includes a static RAM (random access memory) 303 in chip 300. RAM 303 stores the commands issued by host processor 10 to controller 11 in data storage areas or registers 304 and 305. Area 304, labeled DCB 0, contains the commands received for the device 12 enumerated device 0; while area 305, labeled DCB 1, stores the received commands for device 1. Capability can be provided for queuing a series of host processor 10 issued commands for each of the two devices 12, within the two areas 304 and 305, for storing a plurality of DCBs 150 (FIG. 3). One of the devices 12 can perform a freestanding operation while another device 12 can be performing a data transfer operation or another freestanding operation. This overlapping in control facilitates operation of host processor 10 in avoiding delays caused by electromechanical functions of the devices 12. Registers 306 of RAM 303 store sense data generated by the addressed devices 12 and controller 11 in connection with operations of those devices. Sense 0 stores the sense data for device 0, while sense 1 stores sense data for device 1. It will be recalled that the sense data is transmitted from the devices 12 to the controller 11 over the omni connection 31. Controller 11, upon receiving the sense data from the device 12, stores it in RAM 303 in registers 306 for later relaying to host processor 10. Controller 11 also may institute interrupts of processor 300 program execution, as represented by arrow 307. Included in the interrupts are the alert signals supplied over the individual connections 30 to the controller microprocessor 21, as shown in FIG. 1.

FIG. 9 illustrates electronic circuits of circuits 23 in controller 11, optionally in the devices 12, used for detecting index and sector marks. In the illustrated embodiment, a sector mark 225 consists of a monofrequency signal of a predetermined duration, i.e., a predetermined number of cycles. An index mark 190 consists of the same signals, but has a duration twice that of a sector mark. Since each of the devices 12 is constructed to operate consistently with the format shown in FIG. 4, each of the devices 12 includes a gating means (not shown), as is usual in the art for gating the sensed sector and index marks to the FIG. 9 illustrated circuits. Such gated signals are represented in FIG. 9 as an incoming RF (radio frequency) pattern over line 312. The RF pattern comes from detector 58 (FIG. 2). Time-out timers 310 and 320, respectively, time the elapsed time between successive sector and index marks, as will become apparent. When either of the timers times-out, a missing pulse is indicated, respectively, over lines 311 and 321, for undetected sector and index marks.

Returning now to the incoming RF pattern on line 312, the pattern is supplied to integrator and detectors 313 and 323, to respectively detect index and sector marks. The integrators and detectors integrate the received RF pattern and include a threshold detector for detecting a predetermined energy content in the received pattern, which is indicative of the length or duration of the pattern being read. The integrators and detectors are enabled, respectively, over lines 315 and 325 by the timers 310 and 320, which are enabled to time-out by a not-seek signal received over line 328 from seek and track circuits 78. That is, when a device 12 is seeking, i.e., head arm 44 is moving radially for moving the transducer to a target or addressed track, then the sector and index marks are not being read. Additionally, timer 310 is activated by an expect-sector-and-index signal over line 316, which respectively activates the timers to time for a predetermined period, i.e., generate a "window" for detecting the incoming RF pattern 312 by supplying the enable signals over line 315. Whenever timer 310 times-out, integrator and detector 313 has not detected sufficient RF patterns to indicate a sector pulse; timer 310 supplies a missing sector mark indicating pulse over line 311. In the event that integrator and detector 313, while enabled by the signal on line 315, detects sufficient RF pattern on line 312, it emits a sector mark indicating pulse over line 314 which resets timer 310. In a similar manner, timer 320 is enabled by an expect-index pulse signal received over line 326 from controller microprocessor 21 and operates identically to the timer 310. Integrator and detector 323 responds to its enable signal on line 325 and sufficient RF pattern being detected to emit an index-mark-indicating pulse over line 324 to reset timer 320 and turn it off. Additionally, the index pulse is supplied to controller microprocessor 21.

A demark detection circuit for detecting a demark data pattern, referred to by numeral 204 in FIG. 3, is also shown in FIG. 9. Demark pattern 204 has a specific signal pattern. This data pattern is optically detected by detector 58 and supplied as electrical signals over line 331 to integrator and detector 330. Integrator and detector 330 is, in turn, enabled by the data gate signals received from controller microprocessor 21 over line 332 (not shown in FIG. 1) for detecting the demark data pattern. The data gate signal on line 332 is generated by controller microprocessor 21, and corresponds to the time that optical head 216 (FIG. 4) is scanning data portion 203 (FIG. 3) of a target sector. That is, upon the expiration of gap 200 of FIG. 3, known gap detecting circuits in circuits 23 activate controller microprocessor 21 to supply the data gate signal after an orientation hit. When integrator and detector 330 detects the demark data pattern, it supplies a demark indicating signal over line 333 to controller microprocessor 21 indicating that data transfer activity with respect to the demarked sector should be inhibited. Controller microprocessor 21 generates suitable sense data for host processor 10. The subsequent actions of controller microprocessor 21 are known in the data processing art and are not described for that reason.

The track-seeking operation for moving head arm 44 to an addressed track indicated in DCB 150 (FIG. 3) in the track address register 153 is next described. Execution of a SEEK command received from host processor 10 as an implicit first step in executing a READ or WRITE command in controller 11 for device 12, such as represented by step 231 of FIG. 5, is shown in FIG. 10. Numeral 340 of FIG. 10 represents initiation of the controller 11 response to a received host data command. The target track (AT) is read from DCB 150 at step 341 and placed into a controller microprocessor 21 register (not shown). In controller microprocessor 21, at step 342, if controller 11 is not currently storing the address of the track being scanned, current address AC, the controller 11 commands the addressed device 12 (device address indicated in register 151 of DCB 150) to read the address of the track currently being scanned by the head 216. This address is the current address AC. At step 343, controller 11, in controller microprocessor 21, compares AT with AC. If the two track addresses are equal, then the addressed device 12 already is at the desired track or circumvolution. Accordingly, controller 11 proceeds along seek-complete path 344 to step 232 of FIG. 5. If AT and AC are not equal, then a track seek occurs. In a device 12 used with the present invention, two types of seeks can occur: a short seek, or jump, and a long seek. Both seeks are freestanding and independent device 12 operations. To determine which seek is to be performed by the addressed device 12, controller 11 at step 345 subtracts the current address (AC) from the target address (AT) and compares it with a constant K, such as an integer 10. The result of the subtraction can be either positive or negative. Positive results indicate that head arm 44 light beam 47 should be moved radially inwardly, while a negative difference indicates the light beam 47 should be moved radially outwardly. For a track differential of less than K, a short seek is commanded at step 346. A short seek can be a step-by-step movement from track to track of the light beam 47 tracking mirror 57 while checking the intermediate track addresses, or it can be a predetermined time-out radial movement toward the target track. The reached track address is then read out and compared with AT. Another short seek technique is to count track crossings during the seek and then read the reached track address upon completion of the seek. The short seek, in an optical data recorder, can be only moving the laser beam by the tracking mechanism, such as by mirror 57, without moving head arm 44. In this situation, the numeral K is determined by the size of the objective lens 45 and the accommodation of the detector 58 to optical aberrations caused by the laser beam 47 being distorted at the extremities of objective lens 45. A long seek, as performed at step 347, requires head arm 44 motion. The techniques of seeking for a long seek can be the same as for the short seek insofar as the algorithmic control is concerned. Then, at step 342, the current address is again read by controller 11, with all of the above-described steps being repeated until AT=AC, whereupon the seek is completed.

Retrace control within a device 12 as performed by electronic circuits is illustrated in FIG. 11. Pulser 350 is enabled when the IR line 132 is inactive and not indicating inhibit retrace. An index pulse being supplied over line 137 from the FIG. 9 illustrated circuits actuates pulser 350 to emit a pulse to seek and track circuits 78 for actuating same to move mirror 57 for transferring beam 47 one track-pitch radially outwardly. This action is represented in FIG. 4 by arrow 220. When retrace is not inhibited, then the circumvolution should be retraced, which is achieved by jumping one track-pitch to the beginning of the circumvolution from the ending of that circumvolution at index 214.

While the invention has been particularly shown and described with reference to preferred embodiments thereof, it will be understood by those skilled in the art that various changes in form and details may be made therein without departing from the spirit and scope of the invention.

What is claimed is:

1. In a data processing system having a controller and one or more peripheral devices connected to the controller;

the improvement including, in combination:

each said peripheral device having a data-handling unit for performing predetermined data processing operations and having electronic control circuits, including device-programmable means, connected to the data-handling unit for controlling the data-handling unit and for transferring data-representing signals with the data-handling unit;

the controller having electronic control circuits, including controller-programmable means, for controlling said peripheral device and for transferring said data-representing signals with said peripheral device;

connection means for coupling the electronic control circuits of said controller with the electronic control circuits of said peripheral devices for transferring said data-representing signals therebetween and for transferring control information therebetween;

a plurality of selection-connection-control means in said connection means separately and independently extending from the electronic control circuits in the controller to the respective electronic control circuits in said peripheral devices for sending a selection signal individually to but one of said peripheral devices;

data-transfer means in said connection means for transferring data-representing signals between the electronic control circuits of the controller and the electronic control circuits of said peripheral devices;

time-controlled information-transfer means in said connection means for transferring time-controlled information-representing signals between the electronic control circuits in said controller and in said peripheral devices;

device-gating means in each of said peripheral devices connected to said electronic control circuits of said each of said peripheral devices and to said time-controlled information-transfer means, to said data-transfer means and to all of said selection-connection-control means for responding to a selection signal received from a respective selection-connection-control means to pass signals between said connection means time-controlled information-transfer means and data-transfer means to and from the electronic control circuits of said each said peripheral device;

omni-connection-control means in said connection means for transferring predetermined control-information-representing signals including predetermined device commands between the electronic control circuits of any said peripheral devices and said controller independently of said selection signal;

status circuit means in said electronic control circuits of said peripheral devices connected to said omni-connection-control means for transferring status signals to the electronic control circuits of the controller independently of the selection signal and including device address information-bearing signals for indicating to the electronic control circuits of the controller the source of the status signals;

command means in the electronic control circuits of the controller connected to the omni-connection-control means for sending device commands with associated device addresses to all said peripheral devices connected to said omni-connection-control means independently of said selection signals;

status-receiving means in the electronic control circuits of said controller connected to said omni-connection-control means for receiving said status signals and having means for evaluating the received status signals;

command-executing means in the electronic control circuits of said peripheral device connected to the omni-connection-control means for receiving said predetermined device commands and associated device addresses and for responding to said device commands when the associated device address indicates the device, and connected to the data-transfer means and to said status-circuit means for activating the data-transfer means and the status-circuit means for transferring signals between the electronic control circuits in the controller and the electronic control circuits in said peripheral device;

said data-transfer means includes each of said peripheral devices data-format means for indicating predetermined data-format-reference indicia interposed between elements of data to be transferred between said electronic control circuits of said controller and the electronic control circuits of said devices which relate to a predetermined logic arrangement of the data as transferred within the respective said peripheral devices;

format-circuit means in each said peripheral device connected to said device-gating means and to said data-format means and to said selection-connection-control means for responding to the selection signal for transferring said indicated data-format-reference indicia to said controller electronic control circuits; and write/read-circuit-control means in the controller connected to said device-gating means via said time-controlled information-transfer means for actuating same to transfer data signals between the electronic control circuits of a currently selected device and said controller electronic control circuits intermediate in time between successive ones of said indicated data-format-reference indicia.

2. The data processing system set forth in claim 1, further including in each of said peripheral devices:

support means for movably supporting a record member having predetermined record areas for storing data signals which are separated by said format indicia;

transducer means mounted for relative movement in the peripheral device with respect to said support means and arranged to transfer data signals with and sense format indicia recorded on a record member movably supported by said support means and being electrically connected to said data-transfer means of each such peripheral device for transferring data signals therewith and connected to said data-format means for supplying format-indicia-indicating signals thereto; and said command-executing means being connected to said support means for activating the support means to move said record member for enabling the transducer means to access predetermined record areas of the record member.

3. The data processing system set forth in claim 2 wherein said record member is a plate-like disk having a center of rotation and that stores data signals and format-indicia signals in optically sensible write-once indicia in a radially extending series of circumvolutions or concentric tracks coaxially disposed with respect to the center of rotation;

said transducer means including a laser-light-beam source, optical means optically coupled to said laser-light-beam source for shining a light beam on the record member for recording or sensing data signals and having a detector optically coupled to the optical means for receiving said laser-source-supplied light that is reflected from the record member and being connected to the data-transfer means and to said format-circuit means for transferring signals therewith and positioning means on the support means for supporting the transducer means for relative movement with respect to and causing said relative movement with respect to the support means and to cause the light beam to continuously scan a one of said circumvolutions; and directory means on the record member for indicating which of said record areas have been recorded in and being optically sensible by said transducer means.

4. The data processing system set forth in claim 3 wherein said radial series of coaxial circumvolutions constitutes a single spiral track on the record member;

each said peripheral device having tracking means for causing the transducer means to continuously scan a single circumvolution;

inhibit means in each said peripheral device connected to the tracking means for inhibiting the tracking means from continuously scanning said one circumvolution and to scan the spiral track in a succession of at least two circumvolutions;

inhibit-control means in the controller for selectively supplying an inhibit signal and being connected to said time-controlled information-transfer means for transferring said inhibit signal to a selected device; and said inhibit means in each of said peripheral devices being connected to the device-gating means for receiving the inhibit signal via said time-controlled information-transfer means whenever the peripheral device is selected.

5. The data processing system set forth in claim 4 wherein said command means in said controller includes extent means for indicating an extent and the beginning location on the record member for data to be transferred with the record member in a selected peripheral device and being connected to the inhibit-control means for actuating same to send the inhibit signal to the selected peripheral device whenever said indicated extent includes areas from more than one of said circumvolutions.

6. The data processing system set forth in claim 5 wherein said command means in said controller includes recovery means connected to said omni-connection-control means and being connected to said inhibit-control means for actuating same to supply said inhibit signal in response to predetermined ones of said status signals for predetermined ones of said circumvolutions.

7. The data processing system set forth in claim 6 wherein said record member includes an index mark extending along a radial line through all of said circumvolutions, said status-circuit means including means for sensing errors in said index mark at certain ones of said circumvolutions and sending said predetermined ones of said status signals whenever said errors in the index mark are sensed.

8. The data processing system set forth in claim 6 further including, in combination:

error-sensing means in said peripheral device for detecting errors in said format indicia in a given one of said circumvolutions on said disk record member and for supplying such indicia to said controller;

said recovery means of said controller including recovery-sequencing means active when said supplied error indications signify format-indicia errors to actuate said peripheral device to actuate said tracking means to radially move said transducer means to a predetermined circumvolution radially outwardly adjacent to said given one of said circumvolutions and then to supply said inhibit signal to said peripheral device; and timer means in said controller means responsive to said recovery-sequencing means to time the peripheral device operations when said inhibit signal is being sent to said peripheral device whenever said format-indicia-error signals are present.

9. In a disk-type data recorder for recording data signals on and sensing recorded data signals from a record disk having a spiral track for storing data signals and track-indicating signals along its length and with each circumvolution of the spiral being identifiable by respective index marks lying on a common radial line, each said circumvolution of the spiral including a track-switch zone and a plurality of like-sized data-storing sectors each with an embedded sector address, motive means for rotating the disk about an axis of rotation and data means including radially movable transducer means in operative association with said record disk for recording signals on and sensing signals recorded on the record disk;

the improvement including, in combination:

tracking-control means connected to said transducer means for actuating same to track-follow said spiral track and including concentric tracking means connected to said data means for receiving signals indicating that a one of said index marks has been sensed and actuating said transducer means to radially move to an adjacent circumvolution of the spiral track in said track-switch zone such that the same circumvolution of the spiral is repeatedly scanned by said transducer means;

record-access means for indicating a desired access to said spiral track, for a given length of said spiral, beginning at a predetermined rotational position of a predetermined circumvolution of said spiral and for a given length of said spiral;

command means connected to said tracking-control means and to said record-access means for responding to said indicated desired access for inhibiting said actuation of said transducer means whenever said indicated desired access includes access to portions of said spiral track on opposite sides of said respective index mark and said track-switch zone and along the length of the spiral track; and error-control means connected to said command means and to said tracking-control means and being responsive to said tracking-control means not indicating an index mark between any two successively adjacent circumvolutions of the spiral track during a desired access to said spiral track to enable said tracking-control means to access a given circumvolution of said spiral track immediately preceding a predetermined leading one of said two immediately adjacent convolutions and to inhibit said actuation of said transducer means while said transducer means is scanning said given any two successively adjacent circumvolutions of said spiral track whereby those portions of the spiral track immediately adjacent the nonindicated index mark can be assessed.

10. In a first-addressable programmable machine, attachment circuits for connecting the first-addressable programmable machine to a second-addressable programmable machine, both of said programmable machines for concurrently performing data processing operations in synchronism, including in combination:

- a first set of terminals for carrying signals indicative of predetermined machine operational states existing between said programmable machines; a second set of terminals for carrying signals indicative of predetermined control information to be transferred between said programmable machines relating to data processing functions to be performed by one of said programmable machines;
- a third set of terminals for carrying data-bearing signals and time-controlled information-bearing signals of said programmable machines for controlling the carrying of said data-bearing signals;
- a selection circuit connected to a first terminal of said first set for transferring a machine-selection signal to the second-addressable programmable machine and for indicating that a machine selection is active between said programmable machines and that said programmable machines are to jointly conduct predetermined data processing operations including carrying data-bearing signals over said third set of terminals;
- an alert circuit in a one of said addressable programmable machines for indicating a predetermined change in state in the one addressable programmable machine connected to a second terminal of said first set for transferring an alert signal over said second terminal for indicating to another of the addressable programmable machines that the predetermined change in state has occurred which requires predetermined machine operations to be performed by said another of said addressable programmable machines;
- a transmit circuit connected to a transmit terminal of said second set of terminals for transferring programmable-machine-address signals and said predetermined control information to said second programmable machine having the address of said transferred address signals such that the address transfer is independent of said selection circuit;
- a receive circuit connected to a receive terminal of said second set of terminals for receiving programmable-machine address signals and control information from said connected programmable machine and having an address detection circuit for detecting the received address for determining whether or not the received address indicates that the received predetermined control information is to be received by the receive circuit;
- a set of gate means having a plurality of gate means respectively connected to said terminals in said third set and said plurality of gate means being connected to said selection circuit for being enabled to pass said data-bearing signals and said time-controlled information-bearing signals to and from said third set of terminals whenever said selection circuit indicates that said selection is active;
- control-signal means connected to first ones of said plurality of gate means for transferring said time-controlled information-bearing signals with said first ones of said gate means when said selection is active in a predetermined time relationship to said data-bearing signals being passed through second ones of said gate means and to said data processing operations being jointly performed by both said programmable machines.

11. In the first-addressable programmable machine set forth in claim 10, wherein said control-signal means includes data-format means for indicating predetermined data-format-reference indicia interposed between elements of said databearing signals to be transferred with said second ones of said gate means;
- format-circuit means connected to said first ones of said gating means and to said data-format means and to said selection circuit for responding to said machine-selection signal for transferring said indicated data-format-reference indicia with first ones of said gate means; and
- write/read-circuit-control means in said data-format means connected to said gating means for actuating same to transfer said data-bearing signals between said programmable machines intermediate in time between successive ones of said indicated data-format-reference indicia.

12. In the first-addressable programmable machine set forth in claim 11 further including, in combination:
- support means for movably supporting a record member having predetermined record areas for storing said data-bearing signals which are separated by format indicia;
- transducer means mounted for relative movement with respect to said support means and arranged to transfer data signals with and sense said format indicia recorded on said record member while movably supported by said support means and being electrically connected to said second ones of said gate means for transferring said data-bearing signals therewith and connected to said data-format means and to said write/read-circuit-control means for supplying said sensed format-indicia-indicating signals to said data-format means for enabling the data-format means to indicate the predetermined format indicia; and
- command-executing means connected to said support means for activating the support means to move said record member for enabling the transducer means to access predetermined record areas of the record member.

13. In the first-addressable programmable machine set forth in claim 12, wherein said record member is a plate-like disk having a center of rotation and for storing said data-bearing signals and format-indicia signals in optically sensible write-once indicia in a radially extending series of circumvolutions or concentric tracks coaxially disposed with respect to said center of rotation;
- said transducer means including a laser-light-beam means having optical means for shining a light beam on the record member for recording or sensing said data-bearing signals and having a detector optically coupled to the optical means for receiving laser-means-supplied light reflected from the record member and being connected to said second ones of said gate means and to said format-circuit means for transferring format-indicia signals therewtih and positioning means on the support means for supporting the transducer means for relative movement with respect to and causing said relative movement with respect to the support means; and directory means on the record member for indicating which of said record areas have been recorded in and being optically sensible by said transducer means.

14. In the first programmable machine set forth in claim 13, wherein said radial series of coaxial circumvolutions constitutes a single spiral track on the record member;

tracking means in said positioning means for causing the transducer means to track a single circumvolution;

inhibit means connected to the tracking means for inhibiting tracking a single circumvolution and to track the spiral track in a succession of at least two adjacent circumvolutions;

spiralling means for indicating that a predetermined one of said transfers of said data-bearing signals between said transfer means and said second ones of said data areas in said record member in more than one of said circumvolutions;

inhibit-control means connected to said selection circuit to said inhibit means and to said spiralling means for supplying an inhibit-control signal to said inhibit means for actuating same to inhibit tracking a single circumvolution during predetermined ones of said transfers; and said inhibit means being connected to the device-gating means for receiving the inhibit signal via said timecontrolled information-transfer means whenever the device is selected.

15. The data processing system set forth in claim 14, wherein said record member includes an index mark extending along a radial line through all of said circumvolutions, said status-circuit means including means for sensing errors in said index mark at certain ones of said circumvolutions and sending said predetermined ones of said status signals whenever said errors in the index mark are sensed.

16. In a method of operating a peripheral subsystem attachable to a host processor and having a plurality of addressable peripheral devices with a minimum of one addressable peripheral device in any subsystem, the steps of:

over a first set of communication lines extending individually between the host processor and the peripheral devices sending state-control signals for establishing operating states in the peripheral subsystem and reporting the states of the subsystem to the host processor including selecting one of the peripheral devices for establishing a data-transfer state in the subsystem for the selected device;

over a second set of communication lines extending between the host processor and all of the peripheral devices sending predetermined control signals with peripheral-device addresses identifying the peripheral device related to the respective predetermined control signals wherein each of the predetermined control signals relate to said data-transfer state and sending said predetermined control signals independently of whether or not said data-transfer state has been established in said peripheral subsystem for any one of the said peripheral devices;

over a third set of communication lines extending between the host processor to all of the peripheral devices, sending data-bearing signals and time-controlled information-bearing signals in timed association with the data-bearing signals and in each of the peripheral devices passing such data-bearing signals and said time-controlled information-bearing signals only when said data-transfer state is established in the subsystem for the peripheral device; and in each of the devices, establishing signal indications of format indicia related to said data-bearing signals and supplying same to the host processor only when the subsystem is in said data-transfer state for the respective device.

* * * * *